(12) United States Patent
Mori

(10) Patent No.: US 9,108,565 B2
(45) Date of Patent: Aug. 18, 2015

(54) LIGHTING STRUCTURE OF LIQUID CRYSTAL PANEL IN GAUGE FOR VEHICLE

(71) Applicant: YAZAKI CORPORATION, Tokyo (JP)

(72) Inventor: Kouji Mori, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/270,706

(22) Filed: May 6, 2014

(65) Prior Publication Data
US 2014/0240953 A1    Aug. 28, 2014

Related U.S. Application Data

(63) Continuation of application No. PCT/JP2012/079580, filed on Nov. 8, 2012.

(30) Foreign Application Priority Data

Nov. 8, 2011    (JP) .................. 2011-244816

(51) Int. Cl.
| | |
|---|---|
| *B60Q 3/04* | (2006.01) |
| *G01D 11/28* | (2006.01) |
| *B60K 37/02* | (2006.01) |
| *G01D 13/02* | (2006.01) |
| *G01D 13/22* | (2006.01) |

(52) U.S. Cl.
CPC ............... *B60Q 3/044* (2013.01); *B60K 37/02* (2013.01); *G01D 11/28* (2013.01); *G01D 13/02* (2013.01); *G01D 13/22* (2013.01); *B60K 2350/1064* (2013.01); *B60K 2350/203* (2013.01)

(58) Field of Classification Search
CPC ........... B60K 37/02; B60K 2350/1064; B60K 2350/23; B60Q 3/044; G01D 11/28; G01D 13/02; G01D 13/22
USPC ............................................. 362/23.16, 23.21
See application file for complete search history.

(56) References Cited

U.S. PATENT DOCUMENTS

| | | | | |
|---|---|---|---|---|
| 7,629,874 | B2 * | 12/2009 | Araki et al. ................ | 340/425.5 |
| 7,675,428 | B2 * | 3/2010 | Pala et al. ................ | 340/815.78 |
| 2009/0196013 | A1 | 8/2009 | Mezouari | |

FOREIGN PATENT DOCUMENTS

| | | |
|---|---|---|
| GB | 2 450 109 A | 12/2008 |
| GB | 2 472 269 A | 2/2011 |
| JP | 2006-118892 A | 5/2006 |
| JP | 2011-59136 A | 3/2011 |

OTHER PUBLICATIONS

International Search Report dated Feb. 26, 2013 issued in International Application No. PCT/JP2012/079580 (PCT/ISA/210).
Written Opinion dated Feb. 26, 2013 issued in International Application No. PCT/JP2012/079580 (PCT/ISA/237).

* cited by examiner

*Primary Examiner* — Stephen F Husar
(74) *Attorney, Agent, or Firm* — Sughrue Mion, PLLC

(57) ABSTRACT

A lighting structure of a liquid crystal panel in a gauge for a vehicle includes a dial, a pointer member, a liquid crystal display panel, a pointer, and a pointer illuminating light source. The lighting structure further includes an illuminating light dividing and output part, and a luminance adjusting part. The luminance adjusting part includes a first luminance adjusting plate, and a second luminance adjusting plate.

6 Claims, 7 Drawing Sheets

LIGHTING STRUCTURE OF LIQUID CRYSTAL PANEL IN GAUGE FOR VEHICLE

CROSS REFERENCE TO RELATED APPLICATIONS

This application is a continuation of PCT application No. PCT/JP2012/079580, which was filed on Nov. 8, 2012 based on Japanese Patent Application (No. 2011-244816) filed on Nov. 8, 2011, the contents of which are incorporated herein by reference.

BACKGROUND OF THE INVENTION

1. Field of the Invention

The present invention relates to a lighting structure of a liquid crystal panel in a gauge for a vehicle.

2. Description of the Related Art

FIG. 6 and FIG. 7 show a lighting structure of a liquid crystal panel in a gauge for a vehicle disclosed in below-described PTL 1.

The gauge 101 for a vehicle disclosed in the PTL 1 is a gauge mounted on the vehicle as a combination meter having various kinds of measuring functions such as a speed meter, a tachometer, a fuel gauge or the like. The gauge 101 for the vehicle includes, as shown in the drawings, a dial 110, a pointer member 120, a liquid crystal display panel (LCD) 130, a pointer driving part (an inner machine) 140, a plurality of pointer illuminating light sources 150 and a light source 160 for the LCD.

As shown in FIG. 7, the dial 110 has a pointer driving shaft insert hole 111 and a scale and characters 113 (see FIG. 6) corresponding to measured quantities (speed) are arranged substantially in the form of a circular arc on the pointer driving shaft insert hole 111 at a center.

The pointer driving part 140 has a pointer driving shaft 142 formed in the shape of a shaft and inserted into the pointer driving shaft insert hole 111. The pointer member 120 has a pointer main body 122 fixed to an end of the pointer driving shaft 142. Both the pointer driving shaft 142 and the pointer main body 122 are formed with a light guide material. The pointer main body 122 includes a shaft connecting part 122a (see FIG. 7) fixed to the end of the pointer driving shaft 142 and a pointer part 122b (see FIG. 6) extending in a radial direction of the dial 110 from the shaft connecting part 122a to indicate the scale. The pointer main body 122 is illuminated by illuminating lights guided to the pointer driving shaft 142.

The liquid crystal display panel 130 is arranged with a prescribed distance spaced forward from a front end of the shaft connecting part 122a so as to cover a front part of the shaft connecting part 122a. The liquid crystal display panel 130 is used for displaying other measured values than speed (vehicle information such as a travel distance).

The pointer driving part 140 is arranged in a back part of the dial 110 as shown in FIG. 7. The pointer driving part 140 rotates and drives the pointer driving shaft 142 in accordance with a measured value so that the pointer main body 122 indicates the scale corresponding to the measured value.

The plurality of pointer illuminating light sources 150 are arranged in a plurality of parts of the back part of the pointer driving shaft 142 or the dial 110. A part of the plurality of pointer illuminating light sources 150 allows the pointer driving shaft 142 to introduce the illuminating lights to illuminate the pointer main body 122. Further, a part of the plurality of pointer illuminating light sources 150 is also used as a light source for illuminating the dial 110.

As shown in FIG. 7, the light source 160 for the LCD is arranged in a position near to a back surface side of the liquid crystal display panel 130 in one end edge (a lower end edge in FIG. 7) side of the liquid crystal display panel 130 to output illuminating lights to a direction (a direction shown by an arrow mark Y1 in FIG. 7) along the back surface of the liquid crystal display panel 130.

As shown in FIG. 7, in the direction where the light source 160 for the LCD outputs the illuminating lights, a tapered plate shaped light guide member 162 is arranged which distributes the lights outputted from the light source 160 for the LCD to the back surface of the liquid crystal display panel 130.

Namely, in the gauge 101 for the vehicle disclosed in the PTL 1, according to the lighting structure which illuminates the liquid crystal display panel 130, the liquid crystal display panel 130 is irradiated with the illuminating lights outputted from the exclusively used light source 160 for the LCD by means of the light guide member 162 arranged in the back surface side of the liquid crystal display panel 130.

CITATION LIST

Patent Literature

[PTL 1] Japanese Patent Publication No. JP-A-2011-59136

SUMMARY OF INVENTION

Technical Problem

However, in the lighting structure of the liquid crystal display panel 130 disclosed in the PTL 1, since the exclusively used light source 160 for the LCD is provided in the vicinity of the liquid crystal display panel 130, a mechanism for positioning the light source 160 for the LCD or a space for wiring needs to be ensured. As a result, light sources to be mounted are increased, so that a problem arises that a structure in the gauge for the vehicle is complicated or expensive.

Thus, it is an object of the present invention to solve the above-described problem and to provide a lighting structure of a liquid crystal panel in a gauge for a vehicle which can realize a stable illumination having no unevenness in luminance to the liquid crystal display panel mounted on the gauge for the vehicle without adding an exclusively used light source and can prevent a structure in the gauge for the vehicle from being complicated or expensive due to the increase of light sources to be mounted.

Solution to Problem

In order to achieve the object described above, a lighting structure of a liquid crystal panel in a gauge for a vehicle according to the invention is characterized by the following (1) to (9).

(1) A lighting structure of a liquid crystal panel in a gauge for a vehicle including:

a dial having a pointer driving shaft insert hole and a scale corresponding to measured quantities arranged substantially in the form of a circular arc on the pointer driving shaft insert hole at a center;

a pointer member having a pointer main body which includes a shaft connecting part fixed to an end of a pointer driving shaft and a pointer part extending in a radial direction of the dial from the shaft connecting part to indicate the scale, and is formed with a light guide material illuminated by illuminating lights introduced to the pointer driving shaft;

a liquid crystal display panel arranged with a prescribed distance spaced forward from a front end of the shaft connecting part so as to cover a front part of the shaft connecting part;

a pointer driving part including the pointer driving shaft formed in the shape of a shaft with the light guide material and inserted into the pointer driving shaft insert hole, arranged in a back part of the dial and rotates and drives the pointer driving shaft in accordance with a measured value so that the pointer main body indicates the scale corresponding to the measured value; and a pointer illuminating light source arranged in a back part of the pointer driving shaft and allowing the illuminating lights to be introduced to the pointer driving shaft so as to light the pointer main body, wherein the lighting structure includes:

an illuminating light dividing and output part provided to protrude to the liquid crystal display panel side from the front end of the shaft connecting part and outputting a part of the illuminating lights received from the pointer driving shaft to the liquid crystal display panel side; and a luminance adjusting part provided between the illuminating light dividing and output part and the liquid crystal display panel to distribute the illuminating lights outputted by the illuminating light dividing and output part to all areas of the back surface of the liquid crystal display panel, so that a luminance of the liquid crystal display panel is adjusted by a part of the illuminating lights outputted by the pointer illuminating light source.

(2) A lighting structure of a liquid crystal panel in a gauge for a vehicle according to the above-described (1), characterized in that a tubular wall which covers a periphery of the pointer driving shaft is provided in the periphery of the pointer driving shaft, and an inner peripheral surface of the tubular wall is formed in a surface excellent in its reflecting performance that reflects the lights leaking from an outer peripheral surface of the pointer driving shaft into the pointer driving shaft.

(3) A lighting structure of a liquid crystal panel in a gauge for a vehicle according to the above-described (1) or (2), characterized in that a front end surface of the illuminating light dividing and output part opposed to the luminance adjusting part is formed in the shape of a concave lens.

(4) A lighting structure of a liquid crystal panel in a gauge for a vehicle according to the above-described (1) to (3), wherein the luminance adjusting part includes a first luminance adjusting plate arranged so as to be opposed to a front end surface of the illuminating light dividing and output part at a position spaced by a suitable distance from the front end of the illuminating light dividing and output part to the liquid crystal display panel side and a second luminance adjusting plate formed to protrude in the periphery of the front end of the shaft connecting part in the shape of a curved surface recessed to the liquid crystal display panel, a first surface of the first luminance adjusting plate opposed to the illuminating light dividing and output part is formed on a first reflecting surface adapted to diffuse and reflect the lights incident from the illuminating light dividing and output part toward the second luminance adjusting plate, a second surface of the first luminance adjusting plate opposed to the liquid crystal display panel is formed on a third reflecting surface adapted to reflect again the lights incident thereon by a reflection from the surface of the liquid crystal display panel toward the liquid crystal display panel, in the second luminance adjusting plate, a recessed curved surface opposed to the liquid crystal display panel is formed on a second reflecting surface adapted to diffuse and reflect the lights incident from the first reflecting surface on the liquid crystal panel, and opening parts that the front end of the illuminating light dividing and output part is exposed to the liquid crystal display panel side between an outer peripheral edge of the first luminance adjusting plate and an inner peripheral edge of the second luminance adjusting plate function as openings for a direct illumination which allow light beams outputted from the front end of the illuminating light dividing and output part to be directly applied to the liquid crystal display panel.

(5) A lighting structure of a liquid crystal panel in a gauge for a vehicle according to the above-described (4), wherein the first luminance adjusting plate includes an adjusting plate main body having the first reflecting surface and the third reflecting surface and arranged to be opposed to the illuminating light dividing and output part and a plurality of leg parts suspended or vertically provided in an outer periphery of the adjusting plate main body to position the adjusting plate main body at the position spaced by a suitable distance from the front end of the illuminating light dividing and output part to the liquid crystal display panel side and gaps between the adjacent leg parts function as the openings for the direct illumination.

(6) A lighting structure of a liquid crystal panel in a gauge for a vehicle according to the above-described (5), wherein light transmitting holes for transmitting the lights are formed at least in one of the adjusting plate main body and the leg parts.

(7) A lighting structure of a liquid crystal panel in a gauge for a vehicle according to the above-described (5) or (6), wherein in the adjusting plate main body of the first luminance adjusting plate, an irregular form is provided which is adapted to change reflecting directions of the lights from those of a periphery to adjust the luminance of the liquid crystal display panel.

(8) A lighting structure of a liquid crystal panel in a gauge for a vehicle according to the above-described (5) to (8), wherein to a third reflecting surface in an adjusting plate main body, wrinkles or waviness are applied as units for applying a change to reflecting directions of lights.

(9) A lighting structure of a liquid crystal panel in a gauge for a vehicle according to the above-described (5) to (8), wherein the adjusting plate main body is formed with a translucent sheet shaped member.

According to the structure of the above-described (1), in the lighting structure of the liquid crystal display panel, a part of the illuminating lights outputted from the pointer illuminating light source to light the pointer main body 22 is distributed to all the areas of the back surface of the liquid crystal display panel by the illuminating light dividing and output part provided to protrude in the front end of the shaft connecting part of the pointer main body and the luminance adjusting part provided between the illuminating light dividing and output part and the liquid crystal display panel.

Namely, the pointer illuminating light source provided for lighting the pointer main body is also used for illuminating the liquid crystal display panel. Further, by the luminance adjusting part arranged between the illuminating light dividing and output part and the liquid crystal display panel, a bias of the distribution of the lights can be suppressed.

Accordingly, a stable illumination can be realized that has no unevenness in luminance to the liquid crystal display panel mounted on the gauge for the vehicle without adding an exclusively used light source and a structure in the gauge for the vehicle can be prevented from being complicated or expensive due to the increase of the light sources to be mounted.

Further, according to the structure of the above-described (2), the inner peripheral surface of the tubular wall covering the periphery of the pointer driving shaft is formed in the surface excellent in its reflecting performance that reflects the lights leaking from the outer peripheral surface of the pointer driving shaft into the pointer driving shaft. Accordingly, the illuminating lights introduced to the pointer driving shaft from the pointer illuminating light source are prevented from being damped due to the leakage from the pointer driving shaft, so that the lights can be efficiently guided to the pointer main body or the illuminating light dividing and output part from the pointer driving shaft. Thus, an illuminating efficiency to the pointer main body or the liquid crystal display panel can be improved.

Further, according to the structure of the above-described (3), since the front end surface of the illuminating light dividing and output part is formed in the shape of the concave lens, the lights outputted from the illuminating light dividing and output part become diffused lights. Thus, the illuminating lights are diffused and applied to a wide range on the liquid crystal display panel so that the unevenness of luminance on the liquid crystal display panel may be easily eliminated.

According to the structure of the above-described (4), the illuminating lights outputted from the front end surface of the illuminating light dividing and output part are applied to the liquid crystal display panel via the first reflecting surface and the second reflecting surface. Thus, since the reflected lights are diffused respectively on the reflecting surfaces, all the areas of the liquid crystal display panel can be reasonably irradiated with the illuminating lights.

Further, a part of the illuminating lights outputted from the front end surface of the illuminating light dividing and output part is directly applied to the liquid crystal display panel from the openings for the direct illumination. Since the lights outputted form the openings for the direct illumination have different illuminating angles from those of the second reflecting surface, the luminance of the liquid crystal display panel can be finely adjusted by the distribution of the lights from the openings for the direct illumination. Thus, the unevenness of the luminance in the liquid crystal display panel can be more reduced.

According to the structure of the above-described (5), in the first luminance adjusting plate, when the gaps between the leg parts suspended in the outer periphery of the adjusting plate main body or dimensions of length or width of the leg parts are suitably selected, sizes of the openings for the direct illumination can be arbitrarily adjusted. Accordingly, a quantity of light passing through the openings for the direct illumination can be easily adjusted.

According to the structure of the above-described (6), when diameters or the number of the light transmitting holes formed in the adjusting plate main body or the leg parts are adjusted, the quantity of light applied to the liquid crystal display panel can be adjusted and the distribution of the lights to the liquid crystal display panel can be easily finely adjusted.

According to the structure of the above-described (7), since the luminance of the liquid crystal display panel can be adjusted by the irregular form provided on the adjusting plate main body, when the arrangement or size of the irregular form is suitably selected, the luminance to the liquid crystal display panel can be more highly accurately adjusted.

According to the structure of the above-described (8), a reflecting performance of the lights in the third reflecting surface can be changed by the wrinkles or waviness applied to the third reflecting surface. The reflecting performance in the third reflecting surface can be finely adjusted by adjusting the forms of the wrinkles or waviness to be provided which are applied to the third reflecting surface.

According to the structure of the above-described (9), since the adjusting plate main body is formed with the translucent sheet shaped member, when a transparency or surface roughness in the sheet shaped member is suitably set, a prescribed reflecting performance can be ensured in the first reflecting surface or the third reflecting surface. Further, when the sheet shaped member is changed, the reflecting performance of the first reflecting surface or the third reflecting surface can be simply changed to easily change the specification of the adjusting plate main body.

In the lighting structure of the liquid crystal display panel in the gauge for the vehicle according to the present invention, a part of the illuminating lights outputted from the pointer illuminating light source to light the pointer main body is distributed to all the areas of the back surface of the liquid crystal display panel by the illuminating light dividing and output part provided to protrude in the front end of the shaft connecting part of the pointer main body and the luminance adjusting part provided between the illuminating light dividing and output part and the liquid crystal display panel.

Namely, the pointer illuminating light source provided for lighting the pointer main body is also used for illuminating the liquid crystal display panel. Further, by the luminance adjusting part arranged between the illuminating light dividing and output part and the liquid crystal display panel, a bias of the distribution of the lights can be suppressed.

Accordingly, a stable illumination can be realized that has no unevenness in luminance to the liquid crystal display panel mounted on the gauge for the vehicle without adding an exclusively used light source and a structure in the gauge for the vehicle can be prevented from being complicated or expensive due to the increase of the light sources to be mounted.

DETAILED DESCRIPTION OF THE EXEMPLARY EMBODIMENTS

Figure 1:
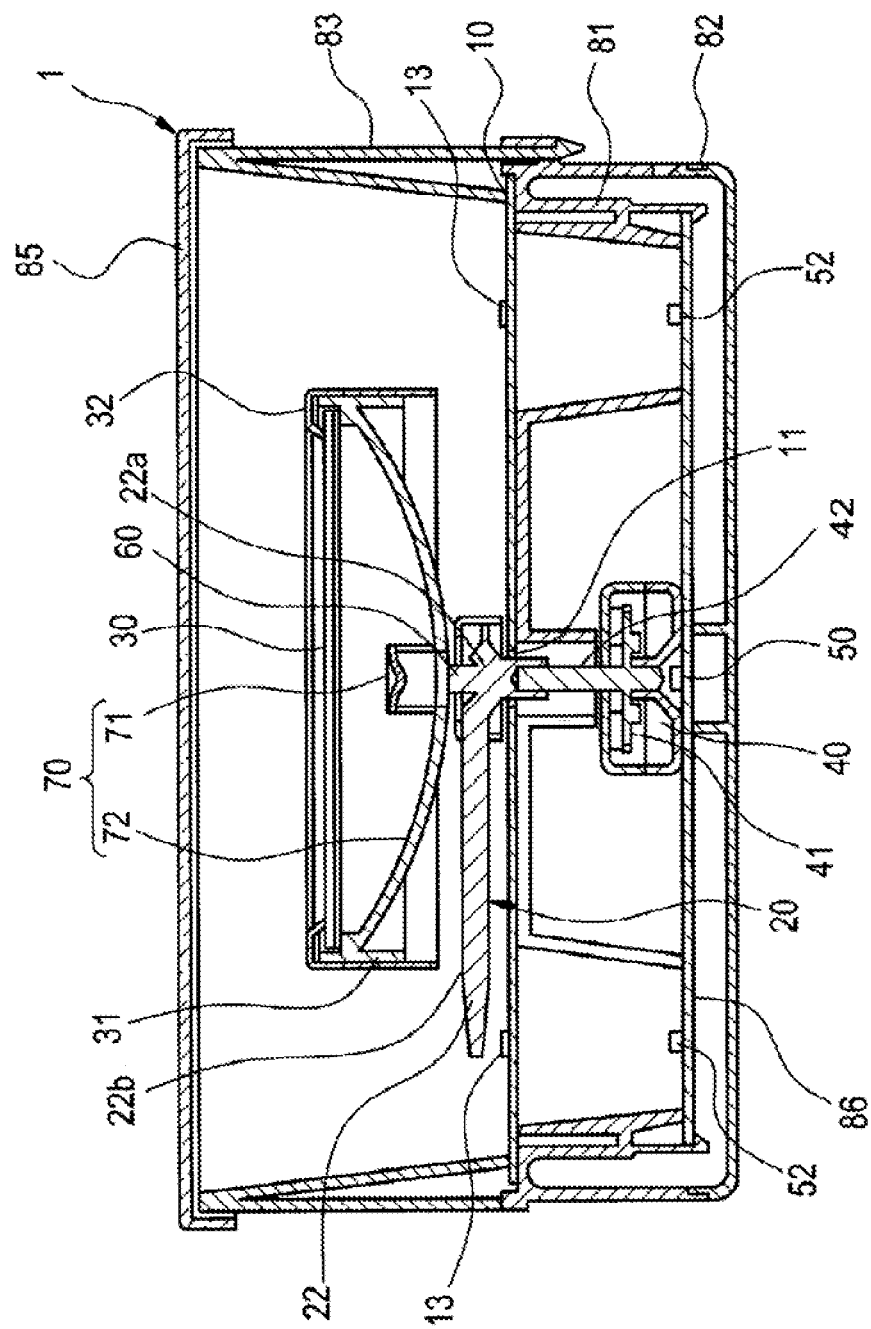
FIG. 1 is a longitudinally sectional view of a first exemplary embodiment of a gauge for a vehicle using a lighting structure of a liquid crystal panel according to the present invention.

Now, a preferred exemplary embodiment of a lighting structure of a liquid crystal panel in a gauge for a vehicle according to the present invention will be described below in detail by referring to the drawings.

Figure 2:
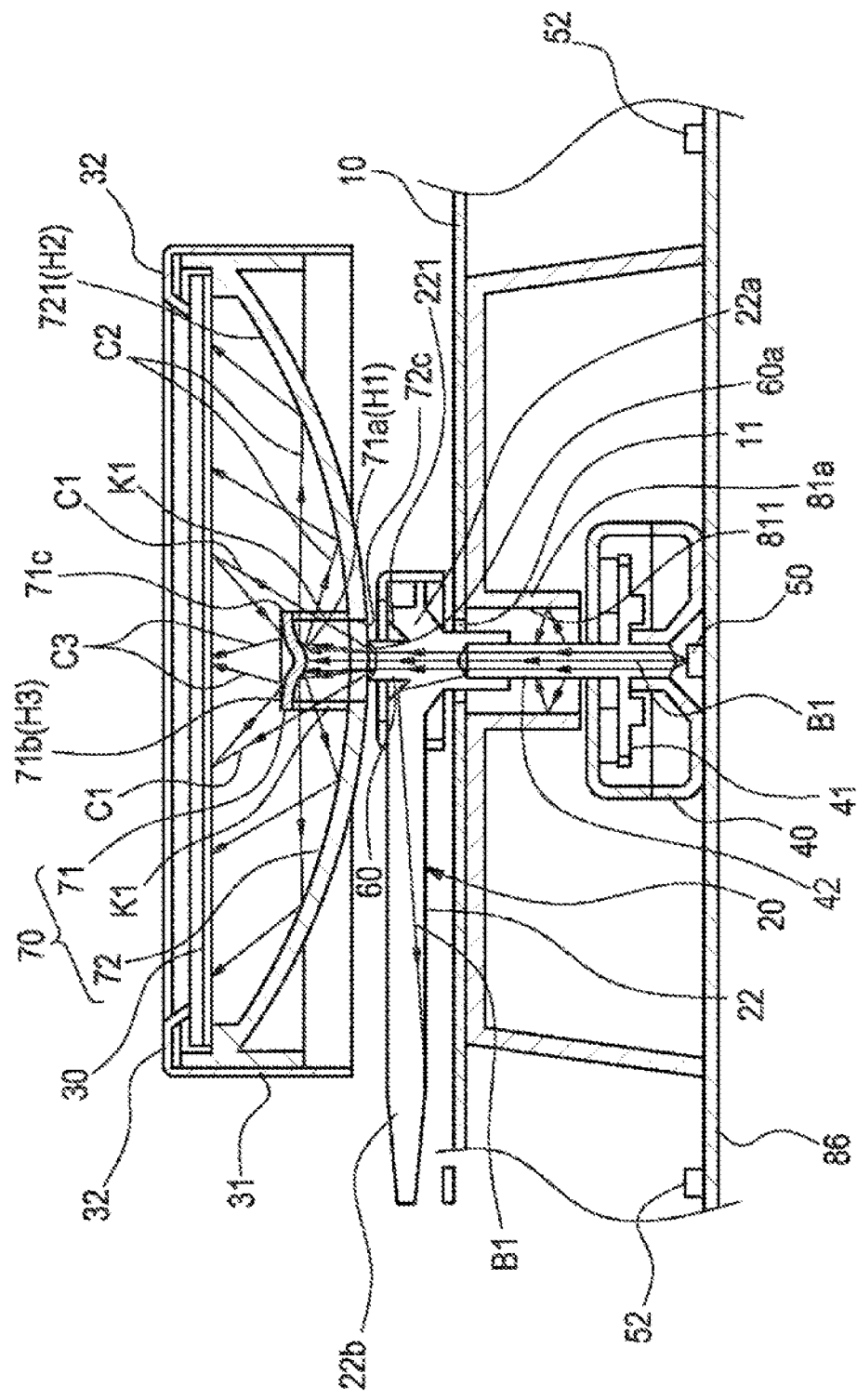
FIG. 2 is an enlarged view of main parts in FIG. 1.
Figure 3:
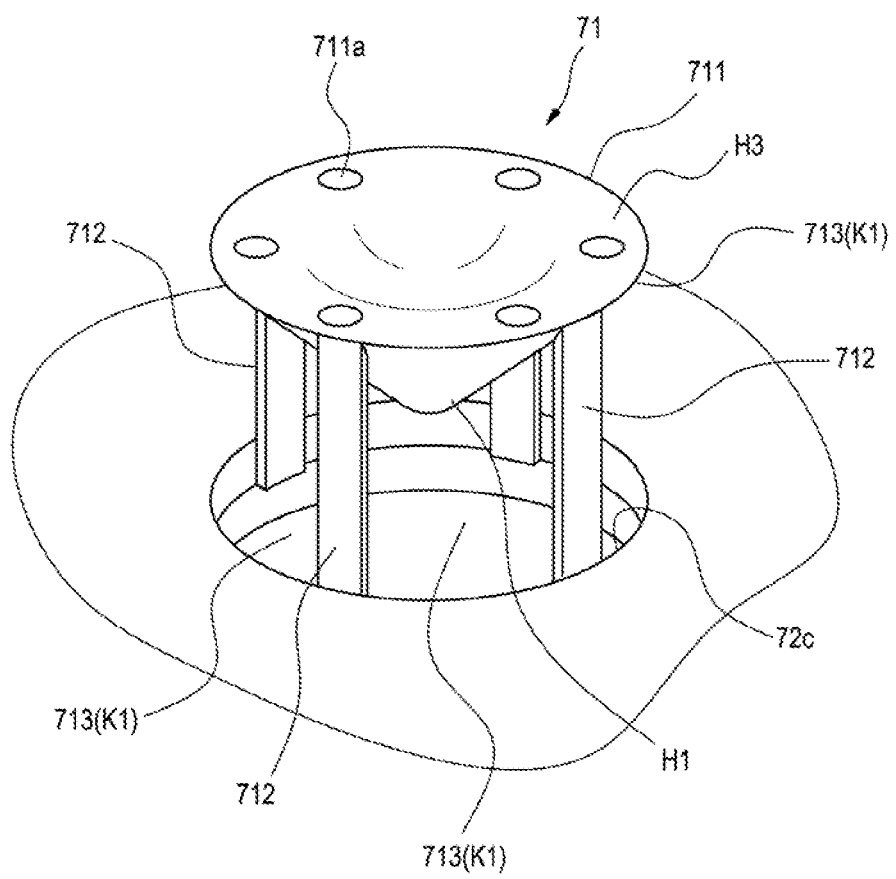
FIG. 3 is an enlarged perspective view of a first luminance adjusting plate shown in FIG. 2.

FIG. 1 to FIG. 3 are explanatory views of the lighting structure of the liquid crystal panel in the gauge for the vehicle according to the present invention. FIG. 1 is a longitudinally sectional view of a first exemplary embodiment of the gauge for the vehicle using the lighting structure of the liquid crystal panel according to the present invention. FIG. 2 is an enlarged view of main parts in FIG. 1. FIG. 3 is an enlarged perspective view of a first luminance adjusting plate shown in FIG. 2.

The gauge 1 for the vehicle of the first exemplary embodiment is a gauge mounted on the vehicle as a combination meter having various kinds of measuring functions such as a speed meter, a tachometer, a fuel gauge or the like. The gauge 1 for the vehicle includes, as shown in FIG. 1, a dial 10, a pointer member 20, a liquid crystal display panel (LCD) 30, a pointer driving part (an inner machine) 40, a pointer illuminating light source 50, an illuminating light dividing and output part 60 and a luminance adjusting part 70.

As shown in FIG. 2, the dial 10 has a pointer driving shaft insert hole 11. Further, in the dial 10, a scale and characters 13 (see FIG. 1) corresponding to measured quantities (speed) are arranged substantially in the form of a circular arc on the pointer driving shaft insert hole 11 at a center.

As shown in FIG. 1, the dial 10 is attached to a front surface of a gauge case 81. The gauge case 81 has a frame structure having a back surface side opened and an opening part of the back surface is covered with a back cover 82. Further, to a front surface side of the gauge case 81, a hood shaped reverse 83 of the cover which protrudes forward is attached.

The reverse 83 of the cover shields a periphery of the dial 10 so that outer lights which lower a visibility are not applied to the dial 10. An opening part of a front surface side of the reverse 83 of the cover is covered with a transparent surface glass 85 as shown in FIG. 1.

The pointer driving part 40 has a pointer driving shaft 42 formed in the shape of a shaft and inserted into the pointer driving shaft insert hole 11. The pointer member 20 has a pointer main body 22 fixed to an end of the pointer driving shaft 42 as shown in FIG. 2. Both the pointer driving shaft 42 and the pointer main body 22 are formed with a light guide (light transmitting) material.

The pointer main body 22 includes a shaft connecting part 22a as a base end part fixed to the end of the pointer driving shaft 42 and a pointer part 22b extending in a radial direction of the dial 10 from the shaft connecting part 22a to indicate the scale. A part of illuminating lights B1 introduced to the pointer driving shaft 42 is introduced to the pointer part 22b by an inclined surface 221 of the shaft connecting part 22a, so that the pointer main body 22 is illuminated by the illuminating lights B1.

In the case of the present exemplary embodiment, as shown in FIG. 2, a tubular wall 81a which covers a periphery of the pointer driving shaft 42 is provided in the periphery of the pointer driving shaft 42.

This tubular wall 81a is formed integrally with the gauge case 81. An inner peripheral surface 811 of the tubular wall 81a is preferably formed in a surface excellent in its reflecting performance that reflects lights leaking from an outer peripheral surface of the pointer driving shaft 42 into the pointer driving shaft 42 by painting the inner peripheral surface in white or applying a specular work thereto.

The liquid crystal display panel 30 is arranged with a prescribed distance spaced forward from a front end of the shaft connecting part 22a so as to cover a front part of the shaft connecting part 22a. In the liquid crystal display panel 30, a peripheral edge part is accommodated and held in a panel accommodating case 31. The panel accommodating case 31 is provided with a vessel 32 which fringes an outer peripheral part of the liquid crystal display panel 30 to arrange an external appearance. The liquid crystal display panel 30 is used for displaying other measured values than speed.

The pointer driving part 40 is arranged in a back part of the dial 10 as shown in FIG. 2. Specifically, the pointer driving part 40 is attached to a circuit board 86 fixed to the gauge case 81 in the back part of the dial 10 or the pointer driving shaft 42 as shown in FIG. 1. The pointer driving part 40 includes the pointer driving shaft 42 formed in the shape of a shaft and inserted into the pointer driving shaft insert hole 11, a gear 41 formed integrally with the pointer driving shaft 42 and a rotation control part not shown in the drawing which applies a rotation corresponding to a measured value to a gear not shown in the drawing which is engaged with the gear 41. The pointer driving part 40 rotates and drives the pointer driving shaft 42 in accordance with the measured value so that the pointer main body 22 indicates the scale corresponding to the measured value.

The pointer illuminating light source 50 is arranged on the circuit board 86 in the gauge case 81 so as to be opposed to the back part (the back surface) of the pointer driving shaft 42. The pointer illuminating light source 50 allows the illuminating lights to be introduced to the pointer driving shaft 42 to light the pointer main body 22 by the illuminating lights B1 introduced or guided from the pointer driving shaft 42 as shown in FIG. 2.

On positions of the circuit board 86 opposed to the dial 10, dial illuminating light sources 52 which illuminate the dial 10 are provided, as shown in FIG. 1 and FIG. 2. The dial illuminating light sources 52 are provided at a plurality of parts on a circumference with respect to a center of the dial 10 (a position through which the pointer driving shaft 42 is inserted) as a central part to light the dial 10.

The illuminating light dividing and output part 60 is a light guide shaft provided to protrude to the liquid crystal display panel 30 side from a front end of the shaft connecting part 22a. The illuminating light dividing and output part 60 is formed integrally with the shaft connecting part 22a. The illuminating light dividing and output part 60 outputs a part of the illuminating lights received from the pointer driving shaft 42 to the liquid crystal display panel 30 side.

A front end surface 60a of the illuminating light dividing and output part 60 opposed to the luminance adjusting part 70 is formed in the shape of a concave lens recessed to the liquid crystal display panel 30 side as shown in FIG. 2.

The luminance adjusting part 70 is provided between the illuminating light dividing and output part 60 and the liquid crystal display panel 30 to distribute the illuminating lights outputted by the illuminating light dividing and output part 60 to all areas of the back surface of the liquid crystal display panel 30. The luminance adjusting part 70 of the present exemplary embodiment includes a first luminance adjusting plate 71 and a second luminance adjusting plate 72 as shown in FIG. 1.

As shown in FIG. 2, the first luminance adjusting plate 71 is arranged so as to be opposed to the front end surface 60a of the illuminating light dividing and output part 60 at a position spaced by a suitable distance from the front end of the illuminating light dividing and output part 60 to the liquid crystal display panel 30 side.

In the first luminance adjusting plate 71, a first surface 71a opposed to the illuminating light dividing and output part 60 is formed on a first reflecting surface H1 which diffuses and reflects the lights incident from the illuminating light dividing and output part 60 toward the second luminance adjusting plate 72.

Further, in the first luminance adjusting plate 71, a second surface 71b opposed to the liquid crystal display panel 30 is formed on a third reflecting surface H3 which reflects again the lights incident thereon by a reflection from the surface of the liquid crystal display panel 30 toward the liquid crystal display panel 30 as shown by optical paths C3 in FIG. 2.

The first luminance adjusting plate 71 will be more specifically described.

As shown in FIG. 3, the first luminance adjusting plate 71 in the present exemplary embodiment includes an adjusting plate main body 711 and a plurality of leg parts 712.

The adjusting plate main body 711 has the above-described first reflecting surface H1 and the third reflecting surface H3 and is arranged to be opposed to the illuminating light dividing and output part 60.

The plurality of leg parts 712 are suspended or vertically provided in an outer periphery of the adjusting plate main body 711. The leg parts 712 position the adjusting plate main body 711 at the position spaced by a suitable distance from the front end of the illuminating light dividing and output part 60 to the liquid crystal display panel 30 side.

In the case of the first luminance adjusting plate 71 of the present exemplary embodiment, gaps 713 between the adjacent leg parts 712 function as openings K1 for a direct illumination. The openings K1 for the direct illumination are opening parts, as shown in FIG. 2 and FIG. 3, that the front end of the illuminating light dividing and output part 60 is exposed to the liquid crystal display panel 30 side between an outer peripheral edge 71c of the first luminance adjusting plate 71 and an inner peripheral edge 72c of the second luminance adjusting plate 72. The openings K1 for the direct illumination allow light beams outputted from the front end of the illuminating light dividing and output part 60 to be directly applied to the liquid crystal display panel 30 as shown by optical paths C1 in FIG. 2.

Further, in the case of the first luminance adjusting plate 71 of the present exemplary embodiment, in the adjusting plate main body 711, light transmitting holes 711a for transmitting the lights are formed pass through as shown in FIG. 3. The plurality of light transmitting holes 711a is provided in the adjusting plate main body 711. In the case of the present exemplary embodiment, the leg parts 712 are not provided with the light transmitting holes 711a, however, the leg parts 712 may be also provided with the light transmitting holes 711a. Further, the light transmitting holes 711a are not provided in the adjusting plate main body 711 and may be provided only in the leg parts 712.

Namely, in the lighting structure of the liquid crystal panel in the gauge for the vehicle, the light transmitting holes 711a for transmitting the lights are formed to pass through at least one of the adjusting plate main body 711 or the leg parts 712 in the first luminance adjusting plate 71.

In the present exemplary embodiment, the second luminance adjusting plate 72 is, as shown in FIG. 2, formed to protrude in the periphery of the front end of the shaft connecting part 22a in the shape of a curved surface recessed to the liquid crystal display panel 30. As shown in FIG. 2, the second luminance adjusting plate 72 is fixed to the panel accommodating case 31 by engaging an outer peripheral part with the panel accommodating case 31.

In the second luminance adjusting plate 72, a recessed curved surface 721 opposed to the liquid crystal display panel 30 is formed on a second reflecting surface H2 which diffuses and reflects the lights incident from the first reflecting surface H1 on the liquid crystal panel 30 as shown by optical paths C2 in FIG. 2.

As shown in FIG. 2, the above-described gauge 1 for the vehicle has the lighting structure which applies a part of the illuminating lights outputted from the pointer illuminating light source 50 to the liquid crystal display panel 30 through the illuminating light dividing and output part 60 and the luminance adjusting part 70 to adjust a luminance of the liquid crystal display panel 30. In other words, the gauge 1 for the vehicle of the present exemplary embodiment is provided with the lighting structure which adjusts the luminance of the liquid crystal display panel 30 by a part of the illuminating lights outputted by the pointer illuminating light source 50.

In the lighting structure of the liquid crystal display panel in the gauge 1 for the vehicle of the above-described first exemplary embodiment, a part of the illuminating lights outputted from the pointer illuminating light source 50 to light the pointer main body 22 is distributed to all the areas of the back surface of the liquid crystal display panel 30 by the illuminating light dividing and output part 60 provided to protrude in the front end of the shaft connecting part 22a of the pointer main body 22 and the luminance adjusting part 70 provided between the illuminating light dividing and output part 60 and the liquid crystal display panel 30.

Namely, the pointer illuminating light source 50 provided for lighting the pointer main body 22 is also used for illuminating the liquid crystal display panel 30. Further, by the luminance adjusting part 70 arranged between the illuminating light dividing and output part 60 and the liquid crystal display panel 30, a bias of the distribution of the lights can be suppressed.

Accordingly, a stable illumination can be realized that has no unevenness in luminance to the liquid crystal display panel 30 mounted on the gauge 1 for the vehicle without adding an exclusively used light source and a structure in the gauge 1 for the vehicle can be prevented from being complicated or expensive due to the increase of the light sources to be mounted.

Further, in the case of the lighting structure of the liquid crystal panel in the gauge 1 for the vehicle of the first exemplary embodiment, as shown in FIG. 2, the inner peripheral surface 811 of the tubular wall 81a covering the periphery of the pointer driving shaft 42 is formed in the surface excellent in its reflecting performance that reflects the lights leaking from the outer peripheral surface of the pointer driving shaft 42 into the pointer driving shaft 42. Accordingly, the illuminating lights introduced to the pointer driving shaft 42 from the pointer illuminating light source 50 are prevented from being damped due to the leakage from the pointer driving shaft 42, so that the lights can be efficiently guided to the pointer main body 22 or the illuminating light dividing and output part 60 from the pointer driving shaft 42. Thus, an illuminating efficiency to the pointer main body 22 or the liquid crystal display panel 30 can be improved.

Further, in the lighting structure of the liquid crystal panel in the gauge 1 for the vehicle of the first exemplary embodiment, since the front end surface 60a of the illuminating light dividing and output part 60 is formed in the shape of the concave lens, the lights outputted from the illuminating light dividing and output part 60 become diffused lights. Thus, the illuminating lights are diffused and applied to a wide range on the liquid crystal display panel 30 so that the unevenness of luminance on the liquid crystal display panel 30 may be easily eliminated.

Further, in the lighting structure of the liquid crystal panel in the gauge 1 for the vehicle of the first exemplary embodiment, the illuminating lights outputted from the front end surface 60a of the illuminating light dividing and output part 60 are applied to the liquid crystal display panel 30 via the first reflecting surface H1 and the second reflecting surface H2. Thus, since the reflected lights are diffused respectively on the reflecting surfaces, all the areas of the liquid crystal display panel 30 can be reasonably irradiated with the illuminating lights.

Further, a part of the illuminating lights outputted from the front end surface 60*a* of the illuminating light dividing and output part 60 is directly applied to the liquid crystal display panel 30 from the openings K1 for the direct illumination. Since the lights outputted form the openings K1 for the direct illumination have different illuminating angles from those of the second reflecting surface H2, the luminance of the liquid crystal display panel 30 can be finely adjusted by the distribution of the lights from the openings K1 for the direct illumination. Thus, the unevenness of the luminance in the liquid crystal display panel 30 can be more reduced.

Further, in the case of the lighting structure of the liquid crystal panel in the gauge 1 for the vehicle of the first exemplary embodiment, in the first luminance adjusting plate 71, when the gaps between the leg parts 712 suspended in the outer periphery of the adjusting plate main body 711 or dimensions of length or width of the leg parts 712 are suitably selected, sizes of the openings K1 for the direct illumination can be arbitrarily adjusted. Accordingly, a quantity of light passing through the openings K1 for the direct illumination can be easily adjusted.

Further, in the case of the lighting structure of the liquid crystal panel in the gauge 1 for the vehicle of the first exemplary embodiment, when diameters or the number of the light transmitting holes 711*a* formed in the adjusting plate main body 711 or the leg parts 712 are adjusted, the quantity of light applied to the liquid crystal display panel 30 can be adjusted and the distribution of the lights to the liquid crystal display panel 30 can be easily finely adjusted.

In the lighting structure of the liquid crystal panel in the gauge for the vehicle according to the present invention, a specific structure of the first luminance adjusting plate 71 is not limited to the structure of the above-described first exemplary embodiment.

For instance, on the third reflecting surface H3 of the adjusting plate main body 711 in the first luminance adjusting plate 71, an irregular form may be provided which changes reflecting directions of the lights from those of a periphery to adjust the luminance of the liquid crystal display panel 30 in place of the light transmitting holes 711*a* shown in FIG. 3.

In such a structure, since the luminance of the liquid crystal display panel 30 can be adjusted by the irregular form provided on the reflecting surface H3 of the adjusting plate main body 711, when the arrangement or size of the irregular form is suitably selected, the luminance to the liquid crystal display panel 30 can be more highly accurately adjusted.

Figure 4:
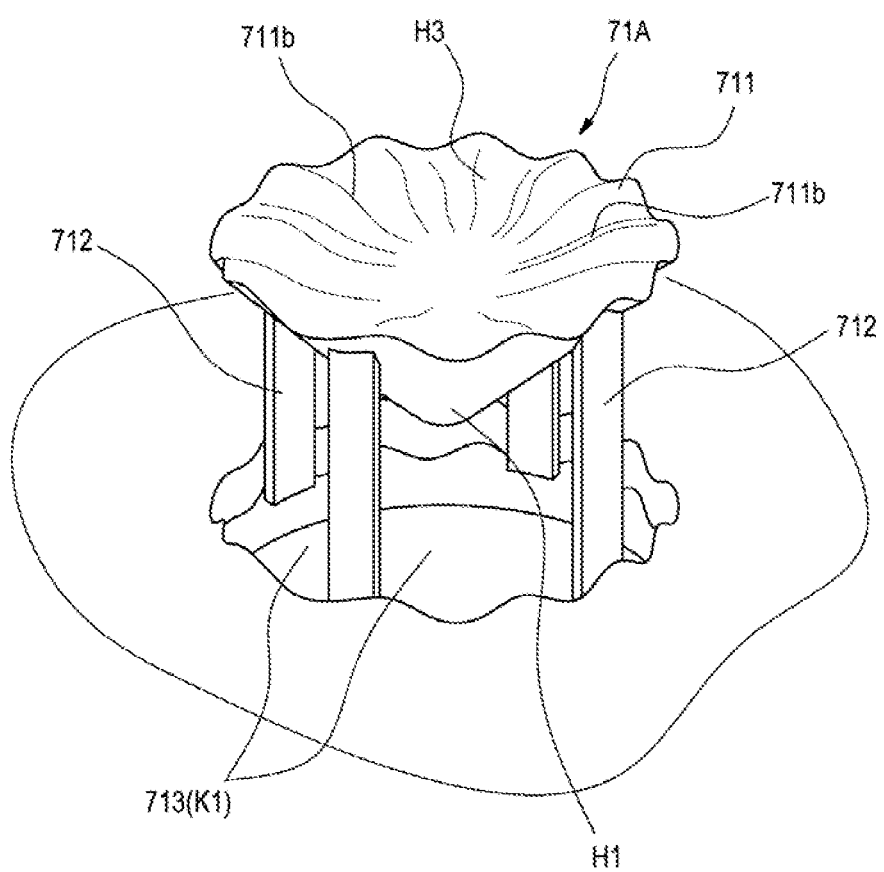
FIG. 4 is an enlarged perspective view of a second exemplary embodiment of a first luminance adjusting plate in the lighting structure of the liquid crystal panel in the gauge for the vehicle according to the present invention.

FIG. 4 is an enlarged perspective view of a second exemplary embodiment of a first luminance adjusting plate in the lighting structure of the liquid crystal panel in the gauge for the vehicle according to the present invention.

A first luminance adjusting plate 71A of the second exemplary embodiment partly improves the first luminance adjusting plate 71 of the first exemplary embodiment. The same structures are designated by the reference numerals common to the first adjusting plate 71 of the first exemplary embodiment and an explanation thereof is omitted.

In the case of the first luminance adjusting plate 71A of the second exemplary embodiment, to a third reflecting surface H3 in an adjusting plate main body 711, wrinkles or waviness 711*b* are applied as units for applying a change to reflecting directions of lights.

In the structure of the first luminance adjusting plate 71A shown in FIG. 4, a reflecting performance of the lights in the third reflecting surface H3 can be changed by the wrinkles or waviness 711*b* applied to the third reflecting surface H3. The reflecting performance in the third reflecting surface H3 can be finely adjusted by adjusting the forms of the wrinkles or waviness 711*b* to be provided which are applied to the third reflecting surface H3.

Figure 5:
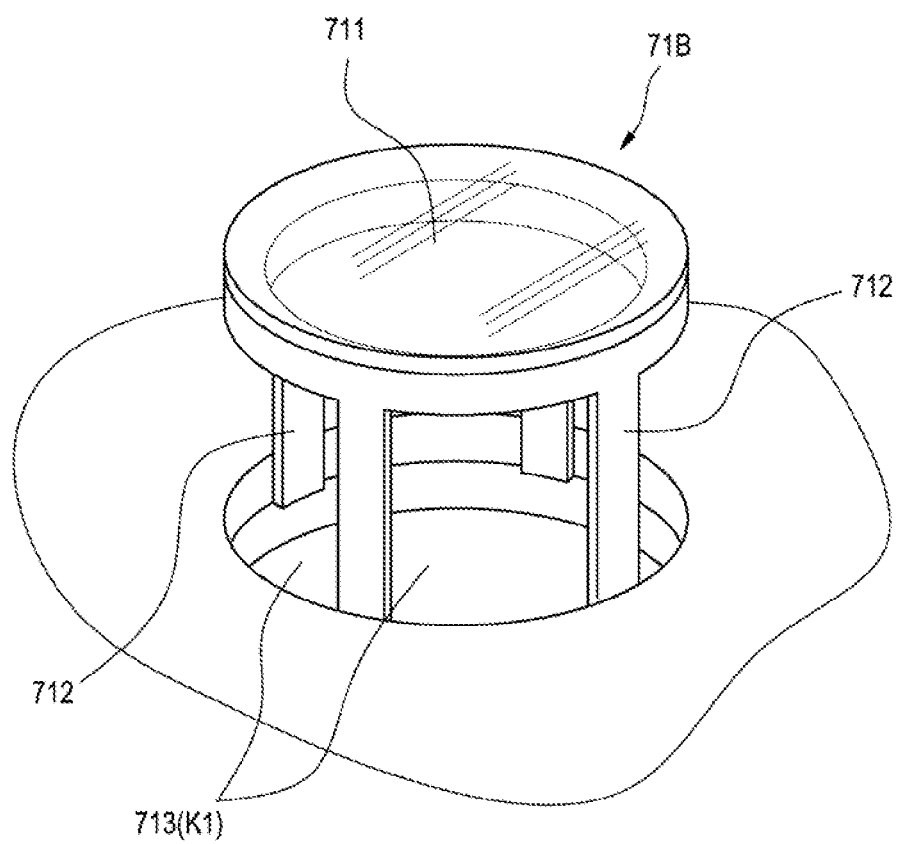
FIG. 5 is an enlarged perspective view of a third exemplary embodiment of a first luminance adjusting plate in the lighting structure of the liquid crystal panel in the gauge for the vehicle according to the present invention.
Figure 6:
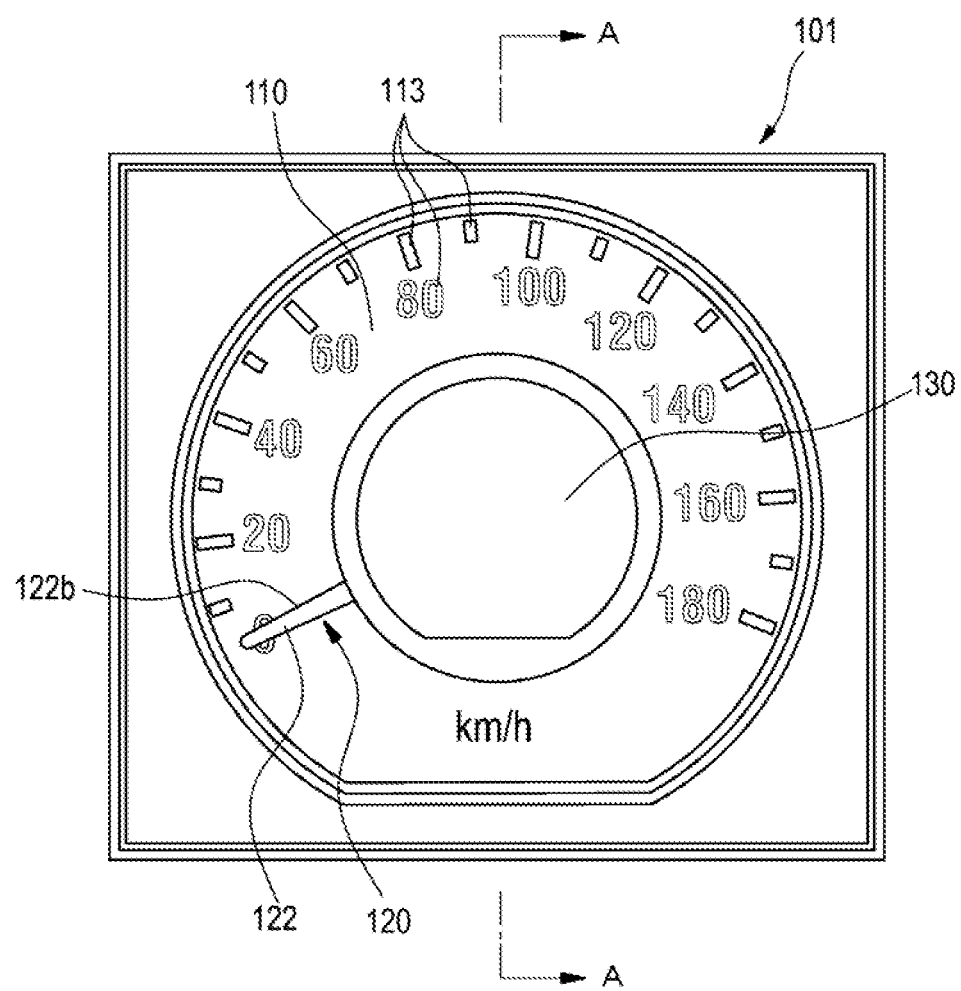
FIG. 6 is a front view of a usual gauge for a vehicle.
Figure 7:
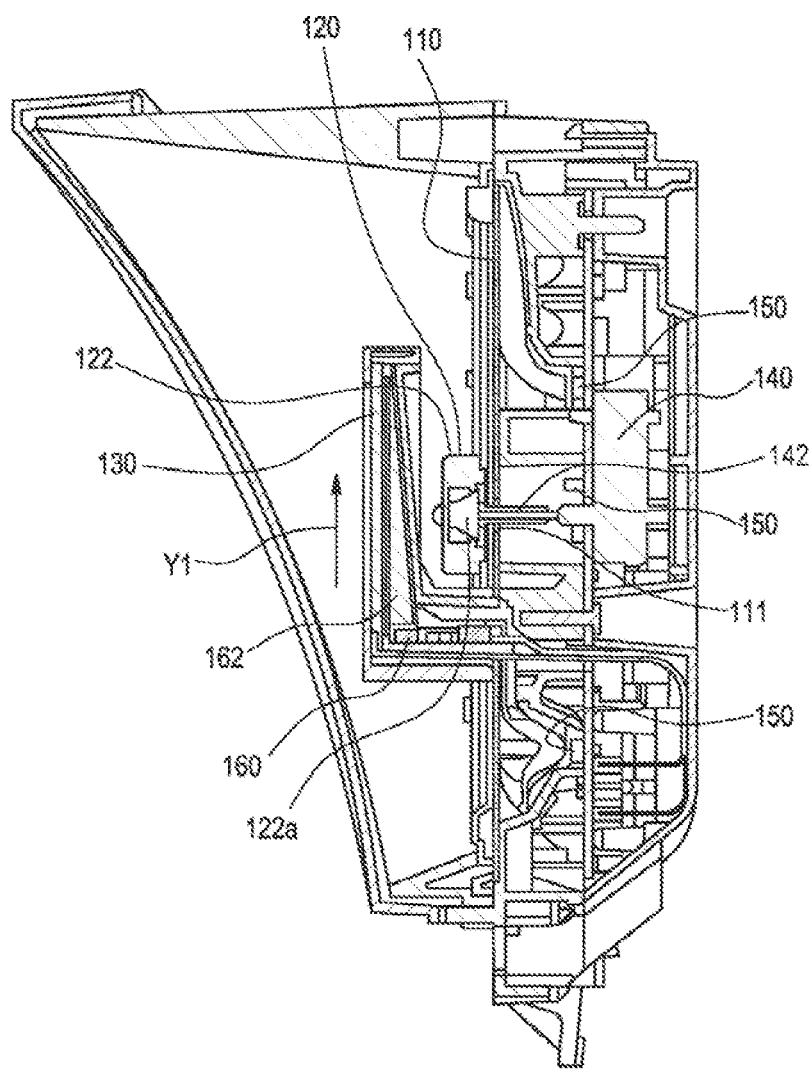
FIG. 7 is a sectional view taken along a line A-A in FIG. 6.

FIG. 5 is an enlarged perspective view of a third exemplary embodiment of a first luminance adjusting plate in the lighting structure of the liquid crystal panel in the gauge for the vehicle according to the present invention.

A first luminance adjusting plate 71B of the third exemplary embodiment partly improves the first luminance adjusting plate 71 of the first exemplary embodiment. The same structures are designated by the reference numerals common to the first adjusting plate 71 of the first exemplary embodiment and an explanation thereof is omitted.

In the case of the first luminance adjusting plate 71B of the third exemplary embodiment, an adjusting plate main body 711 is formed with a translucent sheet shaped member.

In the structure of the first luminance adjusting plate 71B shown in FIG. 5, since the adjusting plate main body 711 is formed with the translucent sheet shaped member, when a transparency or surface roughness in the sheet shaped member is suitably set, a prescribed reflecting performance can be ensured in a first reflecting surface H1 or a third reflecting surface H3. Further, when the sheet shaped member is changed, the reflecting performance of the first reflecting surface H1 or the third reflecting surface H3 can be simply changed to easily change the specification of the adjusting plate main body 711.

The present invention is not limited to the above-described exemplary embodiments, and may be suitably modified or improved. In addition thereto, materials, forms, dimensions, numbers, arrange positions or the like of component elements respectively in the above-described exemplary embodiments may be arbitrary and are not limited as long as the present invention can be achieved.

The present invention is useful for providing a lighting structure of a liquid crystal panel in a gauge for a vehicle which can realize a stable illumination having no unevenness in luminance to the liquid crystal display panel mounted on the gauge for the vehicle without adding an exclusively used light source and can prevent a structure in the gauge for the vehicle from being complicated or expensive due to the increase of light sources to be mounted.

What is claimed is:

1. A lighting structure of a liquid crystal panel in a gauge for a vehicle comprising:
   a dial having a pointer driving shaft insert hole and a scale corresponding to measured quantities arranged substantially in the form of a circular arc on the pointer driving shaft insert hole at a center;
   a pointer member having a pointer main body which includes a shaft connecting part fixed to an end of a pointer driving shaft and a pointer part extending in a radial direction of the dial from the shaft connecting part to indicate the scale, the pointer main body being formed with a light guide material illuminated by illuminating lights introduced to the pointer driving shaft;
   a liquid crystal display panel arranged with a prescribed distance spaced forward from a front end of the shaft connecting part so as to cover a front part of the shaft connecting part;
   a pointer driving part including the pointer driving shaft formed in the shape of a shaft with the light guide material and inserted into the pointer driving shaft insert hole, arranged in a back part of the dial and rotates and drives the pointer driving shaft in accordance with a measured value so that the pointer main body indicates the scale corresponding to the measured value; and a pointer illuminating light source arranged in a back part of the pointer driving shaft and allowing the illuminating lights to be introduced to the pointer driving shaft so as to light the pointer main body, wherein the lighting structure includes:

an illuminating light dividing and output part provided to protrude to the liquid crystal display panel side from the front end of the shaft connecting part and outputting a part of the illuminating lights received from the pointer driving shaft to the liquid crystal display panel side; and a luminance adjusting part provided between the illuminating light dividing and output part and the liquid crystal display panel to distribute the illuminating lights outputted by the illuminating light dividing and output part to all areas of the back surface of the liquid crystal display panel, so that a luminance of the liquid crystal display panel is adjusted by a part of the illuminating lights outputted by the pointer illuminating light source, and the luminance adjusting part includes:

a first luminance adjusting plate arranged so as to be opposed to a front end surface of the illuminating light dividing and output part at a position spaced by a suitable distance from the front end of the illuminating light dividing and output part to the liquid crystal display panel side; and a second luminance adjusting plate formed to protrude in the periphery of the front end of the shaft connecting part in the shape of a curved surface recessed to the liquid crystal display panel.

2. The lighting structure of a liquid crystal panel in a gauge for a vehicle according to claim 1, wherein a first surface of the first luminance adjusting plate opposed to the illuminating light dividing and output part is formed on a first reflecting surface adapted to diffuse and reflect the lights incident from the illuminating light dividing and output part toward the second luminance adjusting plate, a second surface of the first luminance adjusting plate opposed to the liquid crystal display panel is formed on a third reflecting surface adapted to reflect again the lights incident thereon by a reflection from the surface of the liquid crystal display panel toward the liquid crystal display panel, in the second luminance adjusting plate, a recessed curved surface opposed to the liquid crystal display panel is formed on a second reflecting surface adapted to diffuse and reflect the lights incident from the first reflecting surface on the liquid crystal panel, and opening parts that the front end of the illuminating light dividing and output part is exposed to the liquid crystal display panel side between an outer peripheral edge of the first luminance adjusting plate and an inner peripheral edge of the second luminance adjusting plate function as openings for a direct illumination which allow light beams outputted from the front end of the illuminating light dividing and output part to be directly applied to the liquid crystal display panel.

3. The lighting structure of a liquid crystal panel in a gauge for a vehicle according to claim 2, wherein the first luminance adjusting plate includes an adjusting plate main body having the first reflecting surface and the third reflecting surface and arranged to be opposed to the illuminating light dividing and output part and a plurality of leg parts suspended or vertically provided in an outer periphery of the adjusting plate main body to position the adjusting plate main body at the position spaced by a suitable distance from the front end of the illuminating light dividing and output part to the liquid crystal display panel side and gaps between the adjacent leg parts function as the openings for the direct illumination.

4. The lighting structure of a liquid crystal panel in a gauge for a vehicle according to claim 3, wherein light transmitting holes for transmitting the lights are formed at least in one of the adjusting plate main body and the leg parts.

5. The lighting structure of a liquid crystal panel in a gauge for a vehicle according to claim 3, wherein in the adjusting plate main body of the first luminance adjusting plate, an irregular form is provided which is adapted to change reflecting directions of the lights from those of a periphery to adjust the luminance of the liquid crystal display panel.

6. The lighting structure of a liquid crystal panel in a gauge for a vehicle according to claim 3, wherein the adjusting plate main body is formed with a translucent sheet shaped member.

\* \* \* \* \*